A. SUNDH.
HINGE.
APPLICATION FILED MAR. 15, 1915.
1,180,337.  Patented Apr. 25, 1916.
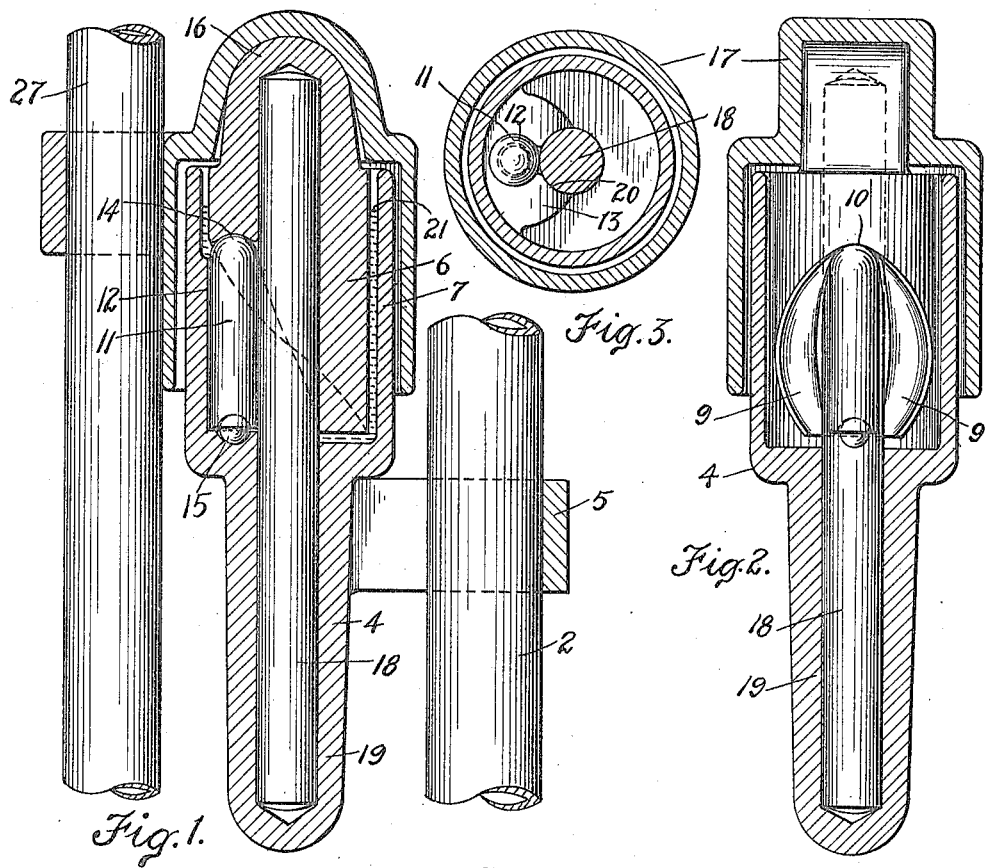
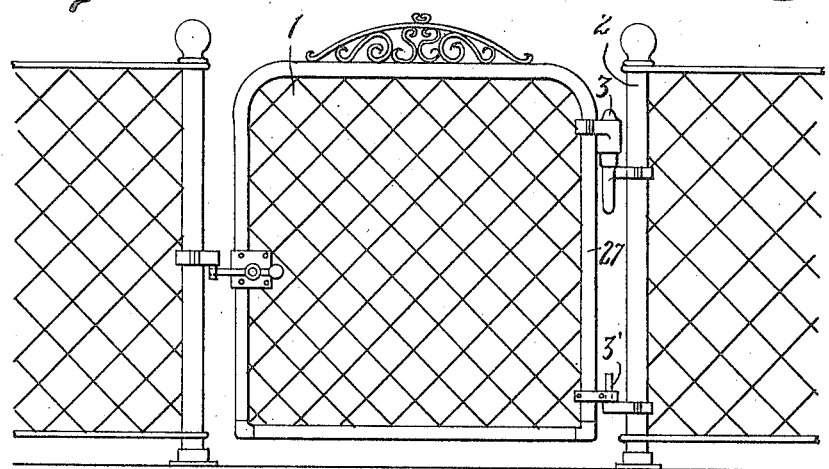
WITNESSES:  INVENTOR
  August Sundh
  BY J. F. Rule,
  ATTORNEY

UNITED STATES PATENT OFFICE.

AUGUST SUNDH, OF HASTINGS-UPON-HUDSON, NEW YORK.

HINGE.

1,180,337.  Specification of Letters Patent.  Patented Apr. 25, 1916.

Application filed March 15, 1915. Serial No. 14,324.

*To all whom it may concern:*

Be it known that I, AUGUST SUNDH, a citizen of the United States, and resident of Hastings-upon-Hudson, in the county of Westchester and State of New York, have invented a certain new and useful Hinge, of which the following is a specification.

My invention relates to improvements in hinges, and as herein shown is particularly adapted to hinges of the gravity operated type, in which a gate or other device carried by the hinge is lifted or cammed upward as it swings to open position so that when released it automatically swings by gravity to closed position. In hinges of this type it is important that the coöperating bearing surfaces shall be of sufficient hardness and properly formed to reduce wear and cutting to a minimum.

A feature of the present invention is the provision of coöperating hinge members having their bearing parts formed to match each other, the construction and design of the hinge being adapted to facilitate the use of hardened steel bearing surfaces and to secure the results above pointed out.

Other features of the invention and the exact nature thereof will be apparent from the following detailed description taken together with the accompanying drawings which illustrate one form of my invention.

Referring to the drawings, Figure 1 is a sectional elevation view of the hinge. Fig. 2 is a similar view looking in a direction at right angles to that of Fig. 1. Fig. 3 is a sectional plan view with the rotatable cam omitted. Fig. 4 shows a gate with a hinge applied thereto.

The gate 1 may be swung from a post 2 by means of an upper hinge 3 and a lower hinge 3'. The hinge 3 may comprise a lower stationary member or part 4 secured to the post 2 by means of a strap 5. A coöperating rotary hinge part or member comprises a cam or bearing piece 6 within a cylindrical casing 7 forming part of the stationary member 4. The lower face of the cam 6 comprises two spiral bearing surfaces 9 which diverge or incline downwardly and outwardly in opposite directions from a high point 10 to the lower end of the cam. These surfaces are adapted to ride on a stationary or non-traveling carrier or bearing part 11 which is shown as a vertical cylindrical pin supported in a correspondingly shaped socket 12 formed in a bearing block 13 (Fig. 3) within the casing 7 and preferably integral therewith. The upper end of the bearing pin 11 is rounded or convex to conform to the shape of the bearing surfaces 9 which are hollow or concave in cross-section as shown at 14 in Fig. 1.

An antifriction bearing ball 15 is interposed between the member 4 and the bottom of the pin 11, said member and pin being provided with hemispherical sockets to receive said ball. This construction permits the bearing piece 11 to rotate freely, there being a slight rotation of said bearing piece during the operation of the hinge, and thus reduces the friction between the bearing surfaces of the parts 6 and 11. Uneven wear is also prevented. The cam 6 has a rounded head 16 which seats in a cap 17, the latter forming a connecting piece between the cam 6 and the frame 27 of the gate. The shape of the head 16 and its socket in the cap 17 is such that the hinge part 6 and the gate may have a slight relative rocking movement in the plane of the gate to automatically adjust the gate to the hinge, but forms a positive driving connection to cause the gate and cam to rotate together. The cap 17 is extended downward in the form of an outer casing surrounding and telescoping with the inner casing 7. A pintle 18 which may be fixed to the cam 6 projects downward within a socket 19 in the stationary part 4, and forms a support and guide for the rotating part. The bearing block 13 may be provided with bearing surfaces 20 for the pintle 18, and the latter may run in contact with the bearing pin 11, and tends to rotate the latter as the gate swings. The casing 7 forms a receptacle for lubricating oil 21 in which all the relatively movable bearing surfaces may be immersed.

In accordance with my invention, the cam 6 is made of hardened steel, preferably chilled steel, and the carrier or pin 11 is also made of hardened steel. Hardened bearing surfaces are thus provided which are adapted to resist wear and prevent cutting of the bearing surfaces. The liability to wear and cutting are further reduced by making the contacting surfaces rounded to match, and by providing for the rotation of the bearing pin 11 about its own axis. It will be observed that not only does the rounded bearing head of the pin 11 conform to the transverse curvature of the cam track as shown in Fig. 1, but also provides inclined bearing surfaces to conform to the inclination or downward slope of the cam track as indicated in Fig. 2. It will further be seen that by the use of bearing pin 11 as a separate piece from the stationary hinge part 4, the problem of providing a suitable bearing surface is greatly simplified.

The invention involves a simple and practical form of hinge which is inexpensive to manufacture, and at the same time durable and reliable. When the gate is closed, the carrier 11 bears on the cam surface at the high point 10, Fig. 2. As the gate is swung open in either direction, the cam rides up on the carrier 11, thereby lifting the gate, which when released automatically swings by gravity back to closed position.

The present application discloses certain features also shown in my co-pending application Serial No. 9795.

Variations may be resorted to within the spirit and scope of my invention.

What I claim as new and desire to secure by Letters Patent of the United States is,—

1. In a hinge, the combination of a cam a centering guide therefor, said cam having bearing surfaces diverging from an intermediate point extending spirally in opposite directions concentrically with said guide, and a bearing piece having a surface to run on said cam surfaces, said bearing piece mounted to rotate freely about an axis parallel with the centering guide to reduce friction and uneven wear at said bearing surfaces.

2. In a hinge, the combination of a stationary hinge part, a hinge part telescoping therewith and rotatable about a vertical axis and adapted to suspend a load, a vertical pintle having its axis coinciding with the said axis of rotation, one of said hinge parts comprising a cam having a bearing surface or track comprising oppositely disposed spiral inclines arranged concentrically with said axis, the other said hinge part carrying a guide mounted to rotate freely about an axis parallel with said pintle and having a bearing surface to run on said track, the bearing surface of said guide being shaped and inclined to conform to the inclination of the said spiral bearing surfaces, when the guide is in any rotative position.

3. In a hinge, the combination of a stationary hinge part, a hinge part telescoping therewith and rotatable about a vertical axis and adapted to suspend a load, a vertical pintle having its axis coinciding with the said axis of rotation, one of said hinge parts comprising a cam having a bearing surface or track comprising oppositely disposed spiral inclines arranged concentrically with said axis, the other said hinge part carrying a guide mounted to rotate freely about an axis parallel with said pintle and having a bearing surface to run on said track, the bearing surface of said guide being shaped and inclined to conform to the inclination of the said spiral bearing surfaces when the guide is in any rotative position, the said stationary hinge part comprising a casing inclosing said cam and guide and forming a receptacle to contain an oil bath in which the bearing surfaces are immersed.

4. In a hinge, the combination of coöperating relatively rotatable hinge parts, one of said parts forming a receptacle to contain a lubricant for the coöperating bearing surfaces of the hinge, one of said hinge parts comprising a cam having spiral bearing surfaces inclined in divergent directions from an intermediate point, a guide mounted to rotate in the other hinge part and having a bearing surface shaped to conform to said spiral inclines while the guide is in any position relative thereto.

5. In a hinge, the combination of coöperating relatively rotatable hinge parts, one of said parts comprising a cam, said cam having inclined bearing surfaces diverging from an intermediate bearing point, and a guiding pin loosely fitted in the other of said hinge parts and having inclined bearing surfaces to run on said first named bearing surfaces.

6. In a hinge, the combination of coöperating relatively rotatable hinge parts, one of said parts comprising a cam, said cam having inclined bearing surfaces diverging from an intermediate bearing point, and a cylindrical guiding pin loosely fitted in the other of said hinge parts and having inclined bearing surfaces to run on said first named bearing surfaces, a central spindle or pintle carried with said cam, said guiding pin being positioned to have rolling contact with said pintle whereby said guiding pin is rotated about its own axis as it runs on said first mentioned bearing surfaces.

7. In a hinge, the combination with a stationary hinge part, of a rotatable hinge part comprising a cam rotatable about a vertical axis, a vertical pintle supporting and guiding the cam, the latter formed with an annular bearing surface or track concentric with the said pintle and comprising a high point and spiral inclines diverging and extending downward from the said high point, the stationary hinge part formed with a vertical socket, a cylindrical guide or pin seated in said socket, the upper end of said pin forming a bearing surface to run on said track when the cam is rotated and to support the weight of the cam and parts carried thereby, and an anti-friction bearing in said socket to support the weight of said guide and parts carried thereby, and permitting the guide to rotate freely in its socket.

8. In a hinge, the combination with a stationary hinge part, of a rotatable hinge part comprising a cam rotatable about a vertical axis, a vertical pintle supporting and guiding the cam, the latter formed with an annular bearing surface or track concentric with the said pintle and comprising a high point and spiral inclines diverging and extending downward from the said high point, the stationary hinge part formed with a vertical socket, a cylindrical guide or pin seated in said socket, the upper end of said pin forming a bearing surface to run on said track when the cam is rotated and to support the weight of the cam and parts carried thereby, said bearing surface of the said guide being hemispherical and the said bearing track being grooved or concaved to conform to the rounded surface of said guide, and an anti-friction bearing interposed between the said stationary hinge part and the said guide and supporting the weight carried by said guide.

Signed at New York city, in the county of New York and State of New York, this 9th day of March, A. D. 1915.

AUGUST SUNDH.

Witnesses:
WALTER C. STRANG,
HAROLD J. RONNE.

Copies of this patent may be obtained for five cents each, by addressing the "Commissioner of Patents, Washington, D. C."